US010501049B1

(12) United States Patent
Rojas Silva et al.

(10) Patent No.: US 10,501,049 B1
(45) Date of Patent: Dec. 10, 2019

(54) SEATBELT ASSEMBLY WITH COLOR CODED LIGHTING FEATURE

(71) Applicant: FORD GLOBAL TECHNOLOGIES, LLC, Dearborn, MI (US)

(72) Inventors: Estefania Rojas Silva, Nicolás Romero (MX); Carmen Frida Vargas Garcia, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/050,335

(22) Filed: Jul. 31, 2018

(51) Int. Cl.
*B60R 22/343* (2006.01)
*B60R 22/48* (2006.01)
*B60Q 3/242* (2017.01)
*A44B 11/25* (2006.01)

(52) U.S. Cl.
CPC .......... *B60R 22/48* (2013.01); *A44B 11/2565* (2013.01); *B60Q 3/242* (2017.02); *B60R 22/343* (2013.01); *B60R 2022/4866* (2013.01)

(58) Field of Classification Search
CPC .................. B60R 22/48; B60R 22/343; B60R 2022/4866; B60Q 3/242; A44B 11/2565
See application file for complete search history.

(56) References Cited

U.S. PATENT DOCUMENTS

| 6,558,027 | B2 | 5/2003 | Ellis et al. | |
| 7,403,106 | B2 | 7/2008 | Yanagi | |
| 8,840,263 | B1* | 9/2014 | Jones | A41D 13/01 362/108 |
| 2007/0245530 | A1* | 10/2007 | Gray | A44B 11/2546 24/633 |
| 2014/0052342 | A1* | 2/2014 | Seibert | B60N 2/002 701/45 |
| 2016/0129830 | A1 | 5/2016 | Ghannam et al. | |
| 2017/0001557 | A1* | 1/2017 | Fujii | A44B 11/2565 |

FOREIGN PATENT DOCUMENTS

| JP | 2007131176 A1 | 5/2007 |
| JP | 2015209155 A | 11/2015 |
| WO | 0205675 A1 | 1/2002 |

OTHER PUBLICATIONS

English Machine Translation of JP2007131176A1.
English Machine Translation of JP2015209155A.

* cited by examiner

*Primary Examiner* — Anabel Ton
(74) *Attorney, Agent, or Firm* — Vichit Chea; King & Schickli, PLLC

(57) ABSTRACT

A seatbelt assembly includes a buckle assembly, having (a) a housing carrying a latching mechanism, a first light source and a first electrical contact, (b) a seatbelt and (c) a latch plate assembly, carried on the seatbelt. The latch plate assembly includes a latch plate and an electrical circuit including a battery, a second light source and a second electrical contact.

20 Claims, 13 Drawing Sheets

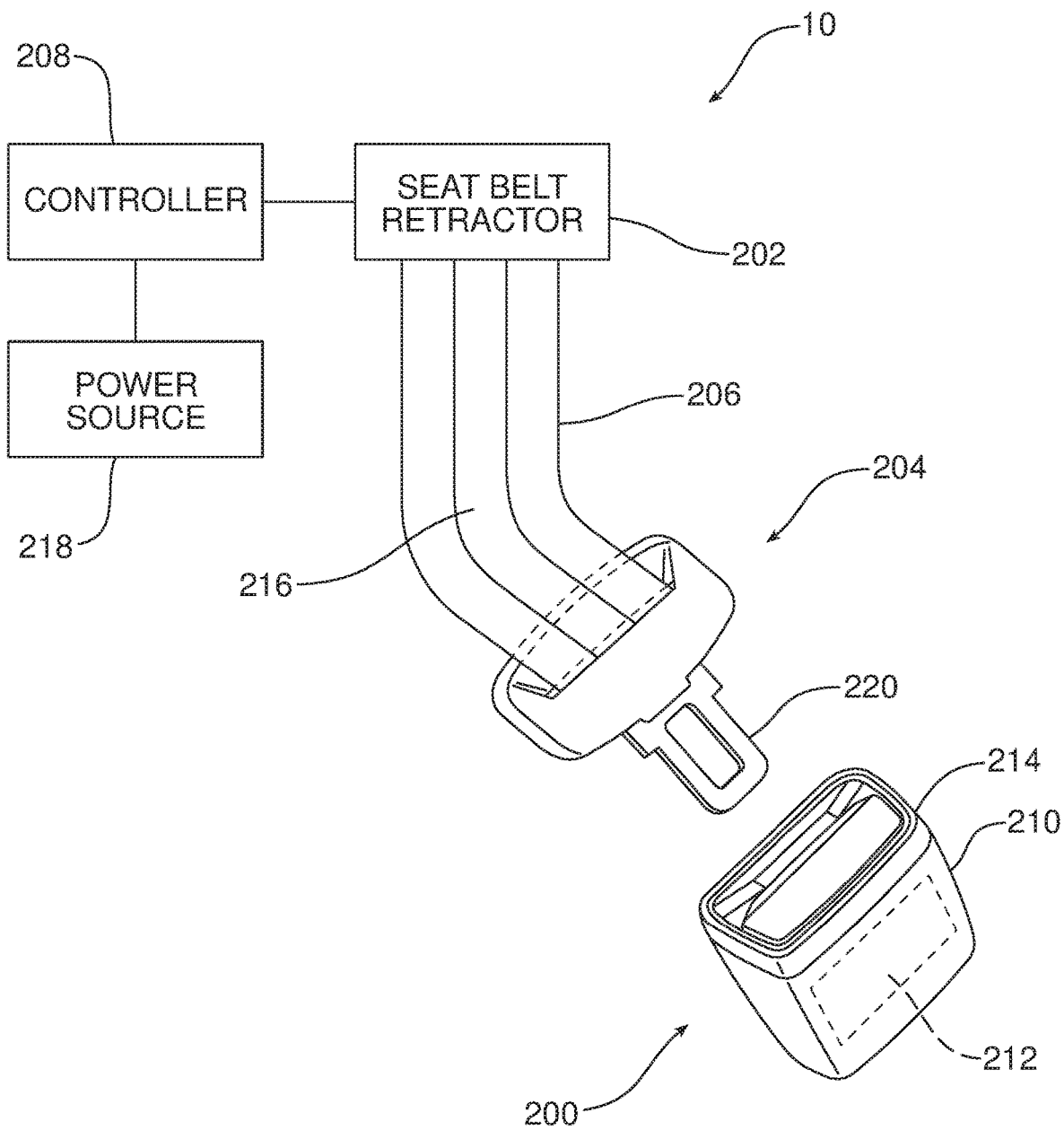

SEATBELT ASSEMBLY WITH COLOR CODED LIGHTING FEATURE

TECHNICAL FIELD

This document relates generally to the motor vehicle equipment field and, more particularly, to a new and improved seatbelt assembly incorporating a color coded lighting system adapted to make it easier to connect a latch plate assembly with a proper, matching buckle assembly of a motor vehicle.

BACKGROUND

Motor vehicles equipped with a bench seat with three seating positions include two side-by-side buckle assemblies. Often in this situation, passengers become confused when seeking to buckle a latch plate assembly of their seatbelt assembly to the correct buckle assembly.

This document relates to a new and improved seatbelt assembly that avoids any potential confusion by providing a color coded system for matching the proper latch plate assembly with the proper buckle assembly. Advantageously, the color coded system incorporates light sources in the matching buckle and latch plate assemblies that illuminate in a particular color to allow matching even in low light conditions.

SUMMARY

In accordance with the purposes and benefits as described herein, a new and improved seatbelt assembly is provided. That seatbelt assembly comprises: (a) a buckle assembly, including a housing carrying a latching mechanism, a first light source and a first electrical contact; (b) a seatbelt; and (c) a latch plate assembly carried on the seatbelt. The latch plate assembly includes a latch plate and an electrical circuit including a battery, a second light source and a second electrical contact.

The first light source on the buckle assembly and the second light source on the latch plate assembly may be identical in color in order to allow a user to easily match the latch plate assembly with the proper buckle assembly of the seatbelt assembly even in the immediate presence of at least one other buckle assembly and at least one other latch plate assembly.

The first electrical contact may engage the second electrical contact when the latch plate is locked in the latching mechanism. This allows the charging of the battery in the latch plate assembly that powers the second light source when one seeks to connect the latch plate assembly with the proper buckle assembly.

In one embodiment of the seatbelt assembly, the latch plate assembly may include a switch between the battery and the second light source. That switch will be a normally open reed switch. In addition, the buckle assembly may include a magnet carried on the housing. The magnetic field of that magnet closes the reed switch when the latch plate assembly is moved near the buckle assembly thereby allowing power from the battery to reach the second light source and provide for its illumination.

In such an embodiment, the seatbelt assembly may further include a controller. That controller may be configured to illuminate the first light source in response to a motor vehicle occupant occupying a seat associated with the seatbelt assembly. Further, the seatbelt assembly may include a presence monitoring device. That presence monitoring device may be adapted to send an occupancy signal to the controller when the occupant is occupying the seat associated with the seatbelt assembly. Further, the controller may be configured to turn off the first light source when the latch plate assembly is properly secured to the buckle assembly.

In an alternative embodiment of the seatbelt assembly, the latch plate assembly may further include a touch sensor adapted to (a) detect when the motor vehicle occupant touches the latch plate assembly and (b) illuminate the second light source in response to that touch.

Such an embodiment of a seatbelt assembly may also include a controller configured to illuminate the first light source in response to a motor vehicle occupant occupying a seat associated with the seatbelt assembly. Further the seatbelt assembly may include a presence monitoring device adapted to send an occupancy signal to the controller when the occupant is occupying the seat associated with the seatbelt assembly.

In addition, the controller may be configured to turn off the first light source when the latch plate assembly is properly secured to the buckle assembly.

In another possible embodiment, the seat belt assembly may comprise: (a) a buckle assembly including a housing carrying a latching mechanism and a first light source, (b) a seat belt retractor, (c) a latch plate assembly including a latch plate and a second light source and (d) a seat belt connecting the seat belt retractor and the latch plate assembly. The seat belt includes an electrical conductor delivering electrical power from the set belt retractor to the second light source.

This embodiment of the seat belt assembly may further include a controller configured to (a) illuminate the first light source in response to a motor vehicle occupant occupying a seat associated with the seat belt assembly and (b) illuminate the second light source in response to a motor vehicle occupant paying out the seat belt from the seat belt retractor.

Still further, the electrical conductor may be illuminated with the second light source. Toward this end, the electrical conductor may comprise an electrotextile material, a conductive ink or the like. The latch plate assembly may include contacts that engage the electrical conductor and function to deliver electrical power from the electrical conductor to the second light source carried on the latch plate assembly.

In still another embodiment, the seat belt assembly comprises: (a) a buckle assembly including a housing carrying a latching mechanism and a first light source, (b) a seat belt retractor, (c) a latch plate assembly, (d) a seat belt connecting the seat belt retractor to the latch plate assembly and (e) a controller configured to illuminate the first light source in response to a motor vehicle occupant occupying a seat associated with the seat belt assembly and illuminate the second light source in response to a motor vehicle occupant paying out the seat belt from the seat belt retractor. In such an embodiment, the second light source may be selected from a group consisting of an electrotextile material, a conductive ink, a combination thereof or the like integrated into the seat belt.

In many of the possible embodiments of the seatbelt assembly, the first light source may comprise a first light emitting diode and the second light source may comprise a second light emitting diode.

In the following description, there are shown and described several preferred embodiments of the seatbelt assembly. As it should be realized, the seatbelt assembly is capable of other, different embodiments and its several details are capable of modification in various, obvious aspects all without departing from the seatbelt assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the seatbelt assembly together with the description serve to explain certain principles thereof.

Figure 7A:
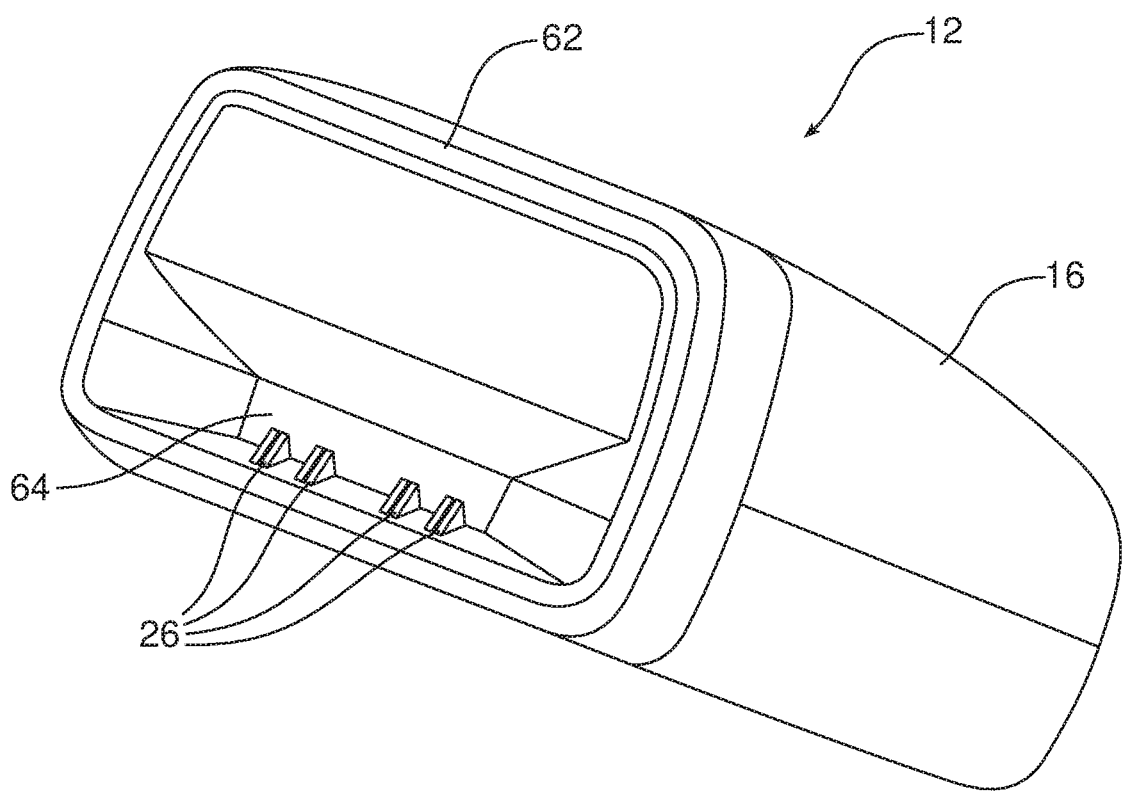
FIG. 7a is a perspective view of a buckle assembly including a first electrical contact.
Figure 7B:
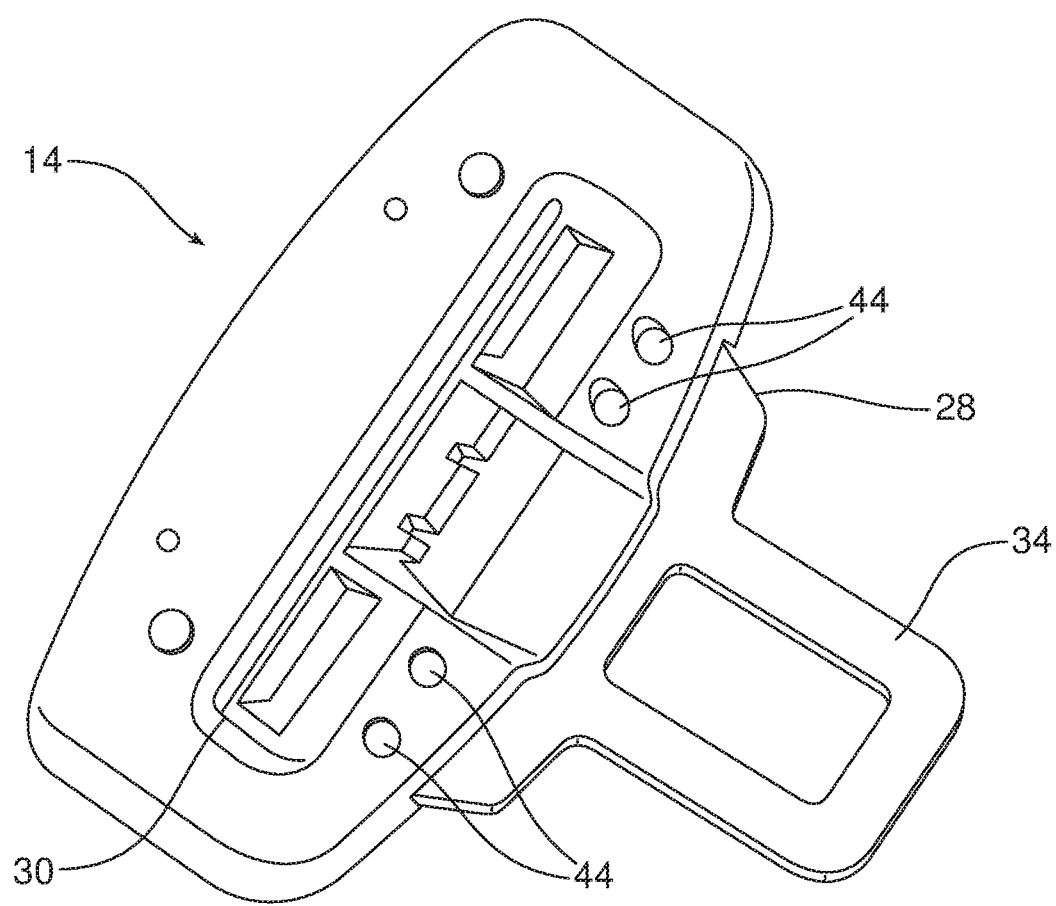

FIG. 7b is a perspective view of a latch plate assembly incorporating a second electrical contact configured or adapted to comprise an electrical connection with a first electrical contact on the buckle assembly illustrated in FIG. 7a when the latch plate assembly is securely latched to that buckle assembly thereby closing a circuit for charging the battery in the latch plate assembly that powers the second light source of the latch plate assembly.

Figure 8:
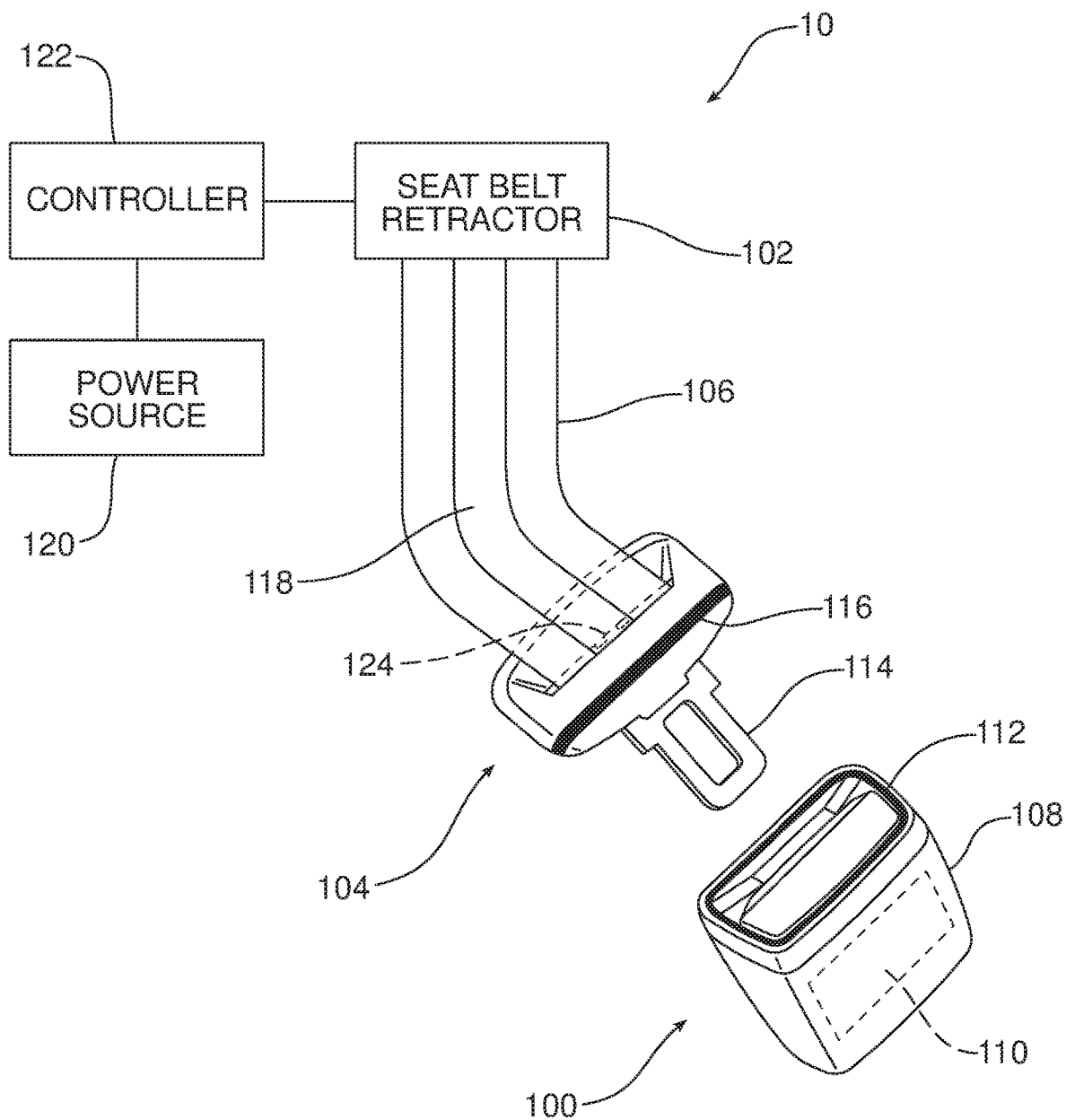

FIG. 8 illustrates another possible embodiment of the seat belt assembly including an electrical conductor extending along the seat belt from the seat belt retractor to the latch plate assembly housing a second light source.

FIG. 9 illustrates yet another possible embodiment of the seat belt assembly wherein the second light source extends along the length of the seat belt.

Reference will now be made in detail to the present preferred embodiments of the seatbelt assembly, examples of which are illustrated in the accompanying drawing figures.

DETAILED DESCRIPTION

Reference is now made to FIGS. 1, 2a-2c, 3a and 3b which illustrate a first possible embodiment of a new and improved seatbelt assembly 10. That seatbelt assembly 10 includes a buckle assembly 12 and a cooperating latch plate assembly 14.

In the illustrated embodiment, the buckle assembly 12 includes a housing 16 carrying a latching mechanism 18 of a type known in the art that is adapted to engage and secure the latch plate assembly 14.

Figure 1:
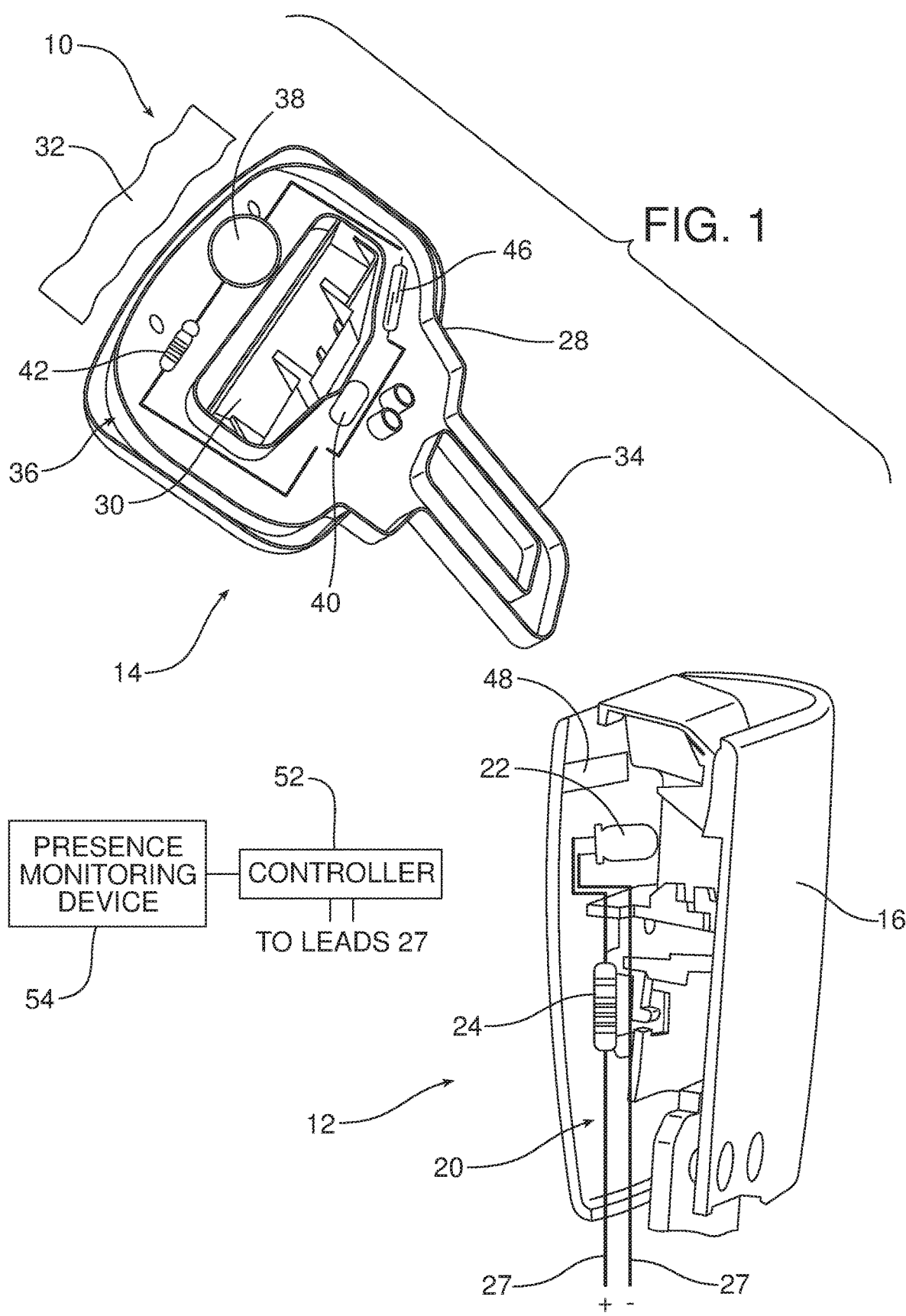
FIG. 1 is a partially cut away, perspective and schematical view of a first possible embodiment of the new and improved seatbelt assembly illustrating the buckle assembly and latch plate assembly of the seatbelt assembly in a disconnected condition.

In addition, as illustrated in FIG. 1, the buckle assembly 12 includes a first electrical circuit 20 including a first light source 22, a resistor 24 and, as further illustrated in FIG. 7a, a first electrical contact 26. The first electrical circuit 20 is connected to the controller 52 (described below) as well as to a power source (not shown) of the motor vehicle by the two leads 27.

The latch plate assembly 14 includes a latch plate 28 having a receiver 30 for receiving a seatbelt 32 and a tongue 34 for engaging with the latching mechanism 18 of the buckle assembly 12.

The latch plate assembly 14 also includes a second electrical circuit 36 including a rechargeable battery 38, a second light source 40, a resistor 42 and, as illustrated in FIG. 7b, a second electrical contact 44.

In order to provide color coded matching of a latch plate assembly 14 with the proper buckle assembly 12, the first light source 22 on the buckle assembly and the second light source 40 on the latch plate assembly, when illuminated, are identical in color. Further, it should be appreciated when the tongue 34 of the latch plate assembly 14 is properly secured and engaged in the latching mechanism 18 of the buckle assembly 12, the first electrical contact 26 engages with the second electrical contact 44 thereby completing an electrical circuit that allows for the charging of the rechargeable battery 38 carried on the latch plate assembly.

In the embodiment of the seatbelt assembly 10 illustrated in FIG. 1, the switch 46 is positioned in the second electrical circuit 36 between the rechargeable battery 38 and the second light source 40. In the illustrated embodiment, that switch 46 comprises a normally open reed switch.

Figure 2A:
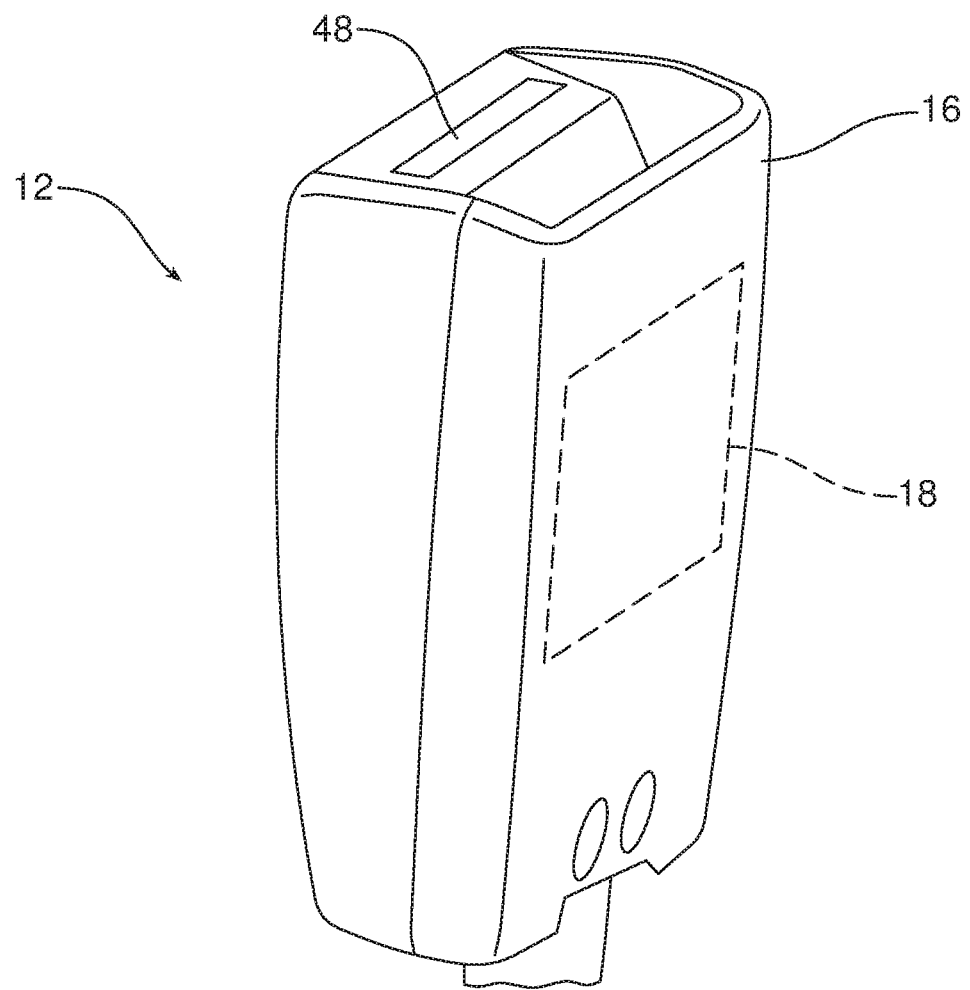
FIGS. 2a-2c are a series of views illustrating different possible positions for the mounting of a magnet within the buckle assembly.
Figure 2B:
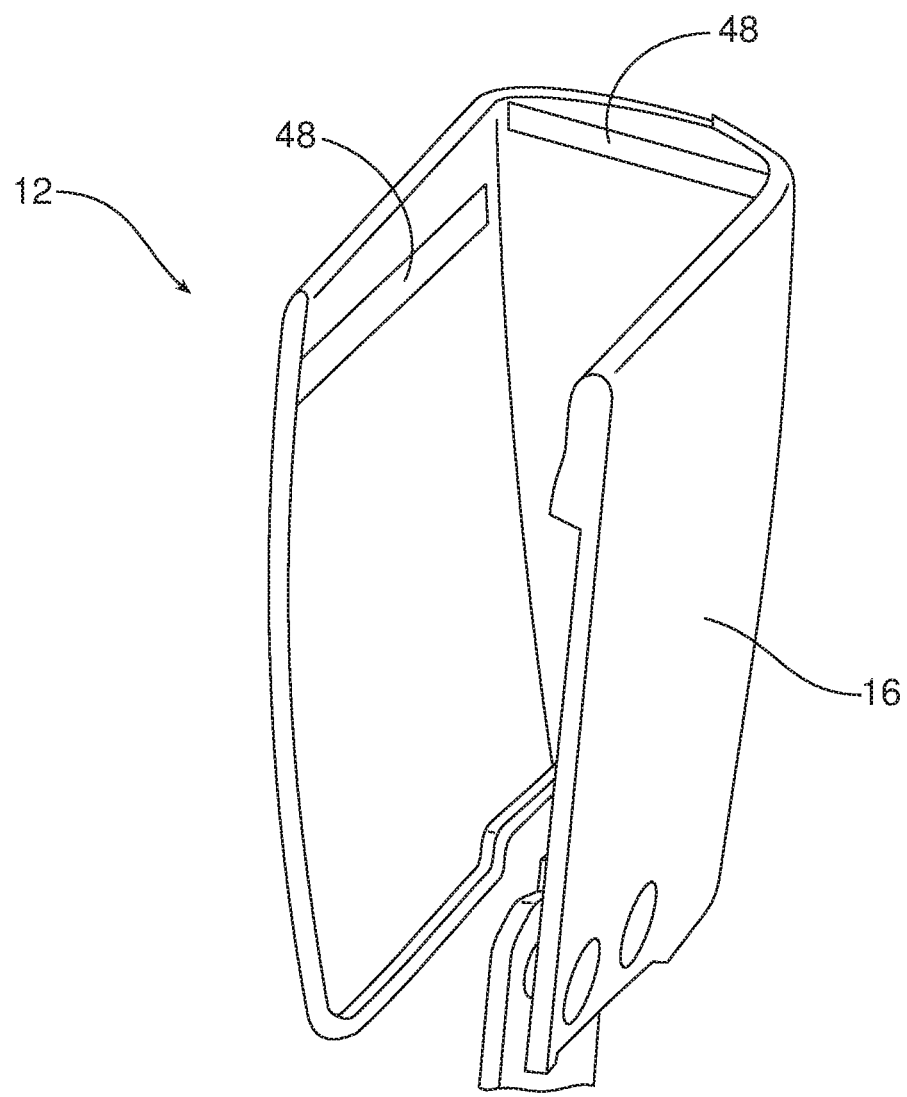
Figure 2C:
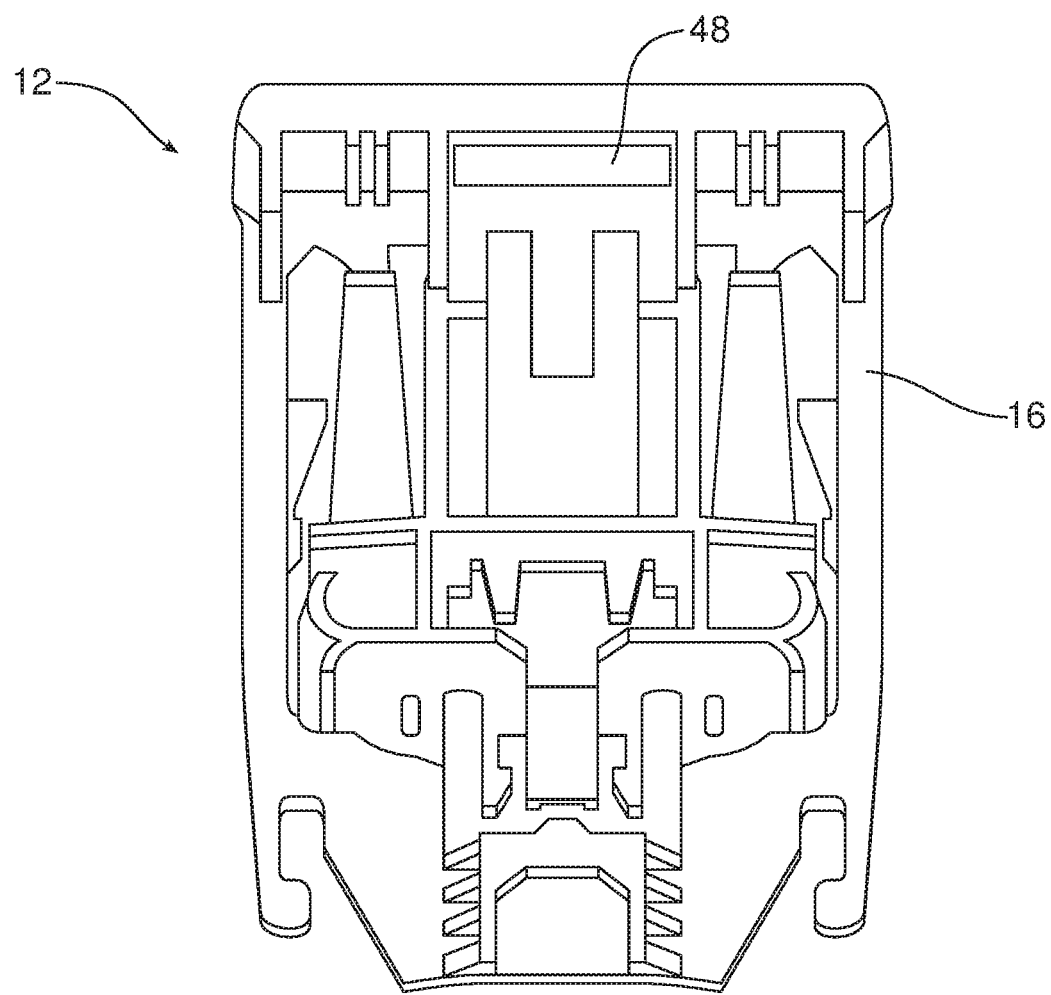

As further illustrated in FIG. 1, the buckle assembly 12 of the first embodiment includes a magnet 48. The magnet 48 may comprise a permanent magnet or an electromagnet. As illustrated in FIGS. 2a, 2b and 2c the magnet 48 may be mounted or carried at various positions within or on the housing 16 of the buckle assembly 12.

Figure 3A:
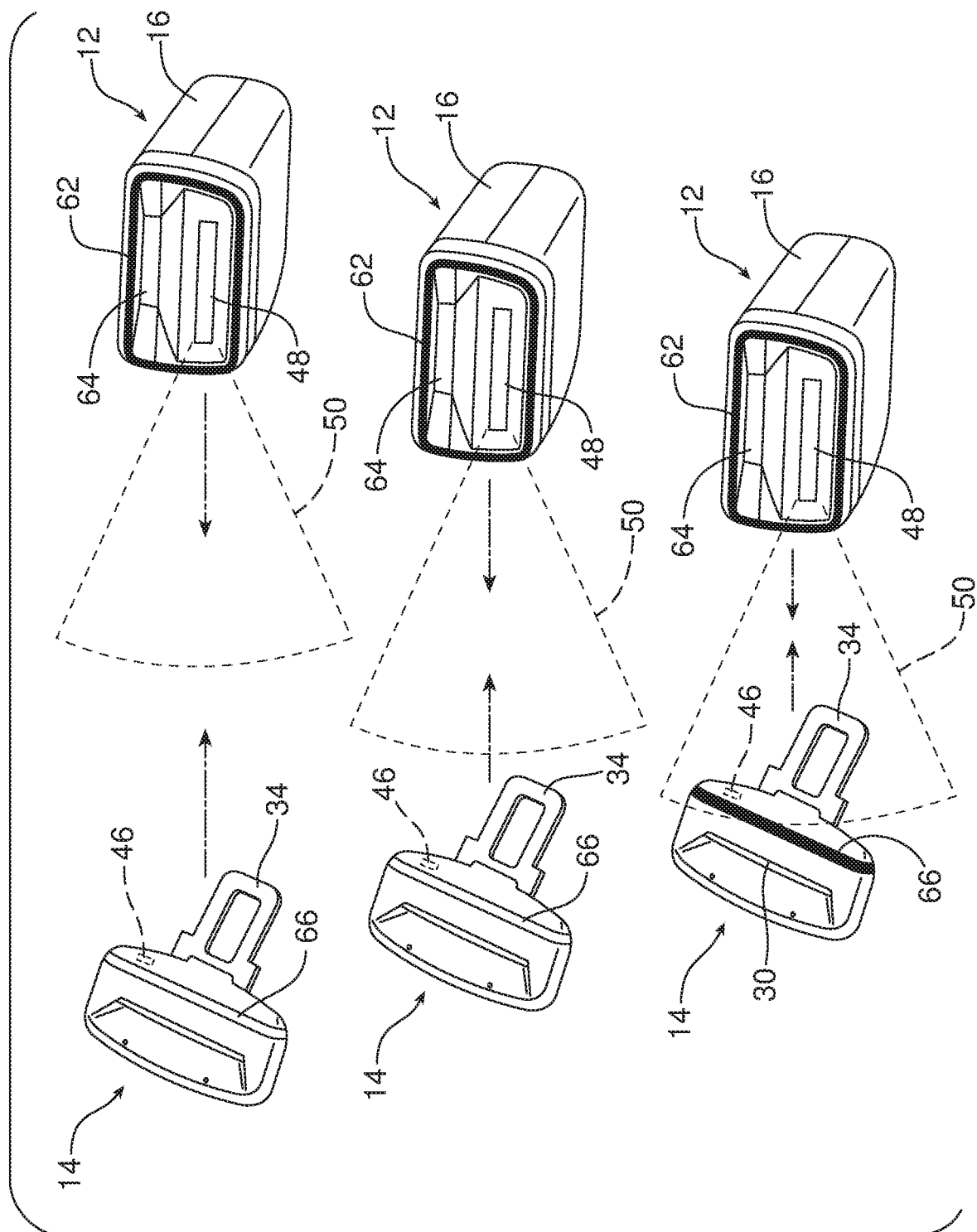
FIG. 3a is a series of views illustrating how the light source on the latch plate assembly is illuminated when the latch plate assembly is moved near the buckle assembly.

As best illustrated in FIG. 3a, the magnet 48 generates a magnetic field, generally designated by reference numeral 50. As the user displaces the latch plate assembly 14 toward the buckle assembly 12, the normally open reed switch 46 comes into contact with the magnetic field 50. This activates the normally open reed switch 46 causing the reed switch to close (lowermost portion of FIG. 3a and FIG. 3b). When the normally open reed switch 46 is closed, the circuit between the rechargeable battery 38 and the second light source 40 is completed and the power from the rechargeable battery is provided to the second light source 40 causing that light source to become illuminated.

As further illustrated in FIG. 1, the seatbelt assembly 10 also includes a controller 52. The controller 52 may comprise a computing device such as dedicated microprocessor or an electronic control unit (ECU) operating in accordance with instructions from appropriate control software. Thus, the controller 52 may comprise one or more processors, one or more memories and one or more network interfaces all in communication with each other over one or more communication buses. In the illustrated embodiment, the controller 52 is connected to a presence monitoring device 54 adapted to send an occupancy signal to the controller when an occupant is occupying the seat associated with the seatbelt assembly 10. Such a presence monitoring device 54 may comprise a weight sensor in the seat, a camera or any other presence monitoring device of a type known in the art and suitable for this intended purpose.

Figure 3B:
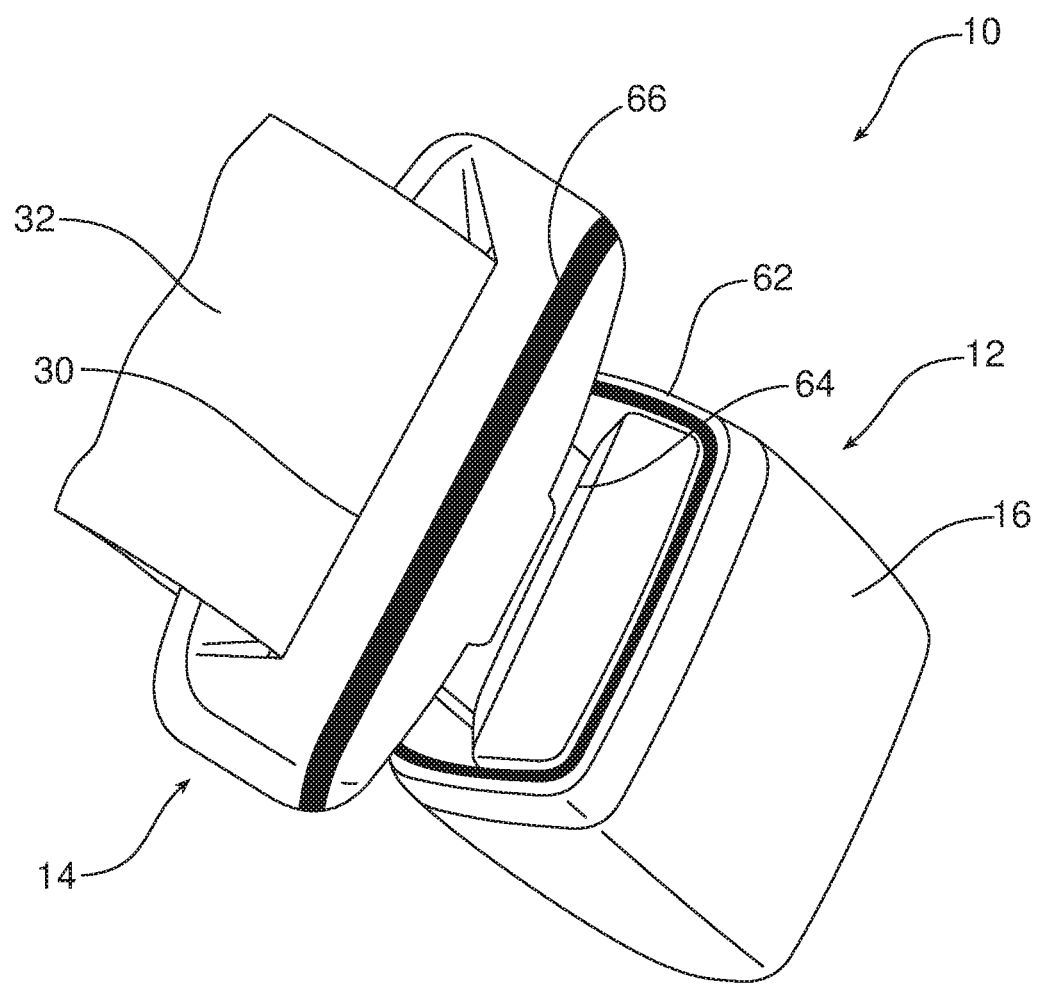
FIG. 3b illustrates the seatbelt assembly of FIG. 1 in the latched configuration with the latch plate assembly properly buckled and latched to the buckle assembly.

In the embodiment illustrated in FIGS. 1, 2a-2c and 3a-3b, the controller 52 is configured to illuminate the first light source 22 of the buckle assembly 12 in response to a motor vehicle occupant occupying the seat associated with the seatbelt assembly 10. Further, the controller 52 may be configured to turn off the first light source 22 after the latch plate assembly 14 is properly secured to the buckle assembly 12 as illustrated in FIG. 3b. Data respecting the proper connection of the seatbelt assembly 10 may be provided by a standard state of the art seatbelt monitoring system commonly provided in today's motor vehicles.

Figure 4:
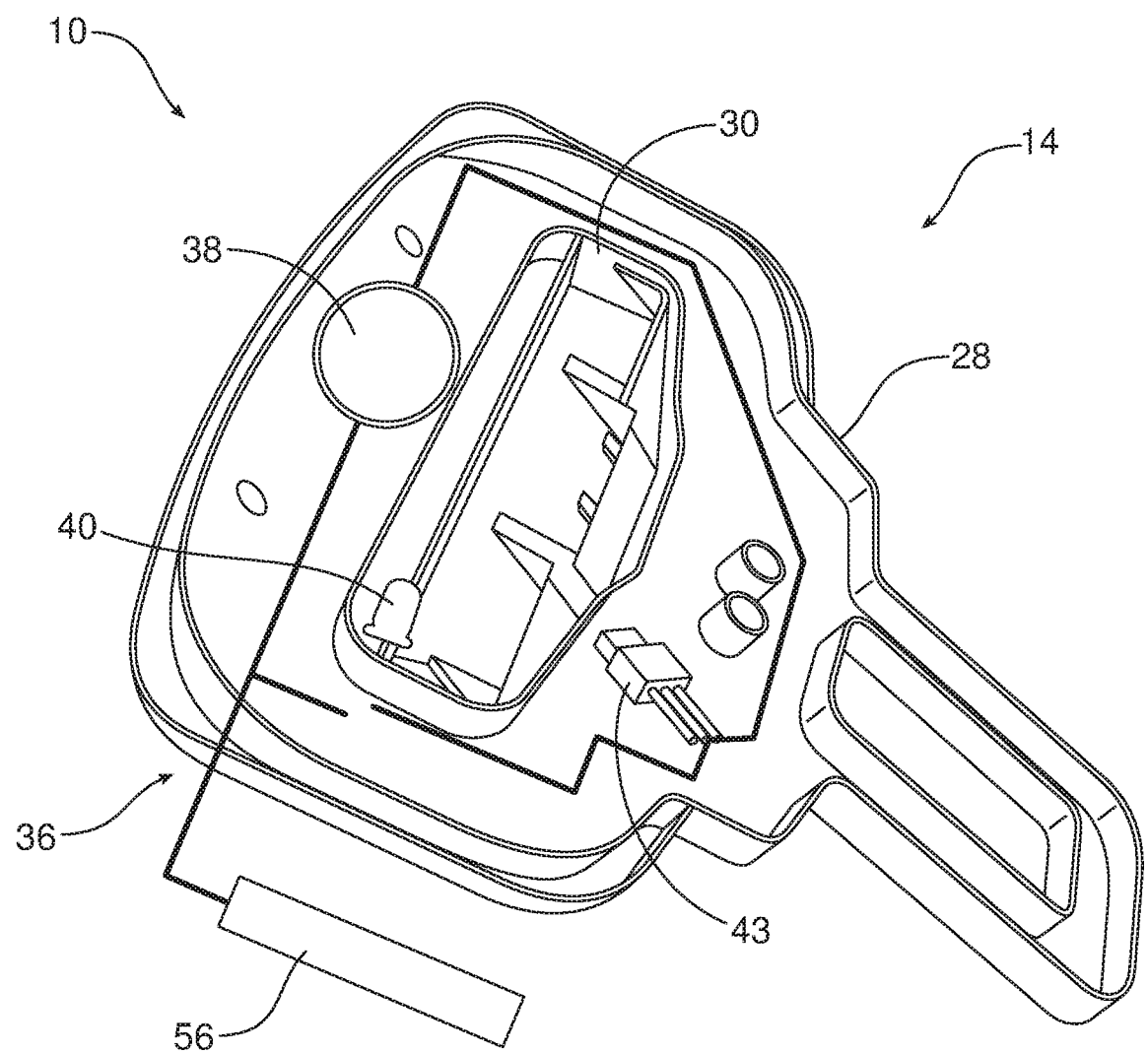
FIG. 4 is a schematic perspective view of the latch plate assembly of a second possible embodiment of the seatbelt assembly.
Figure 5:
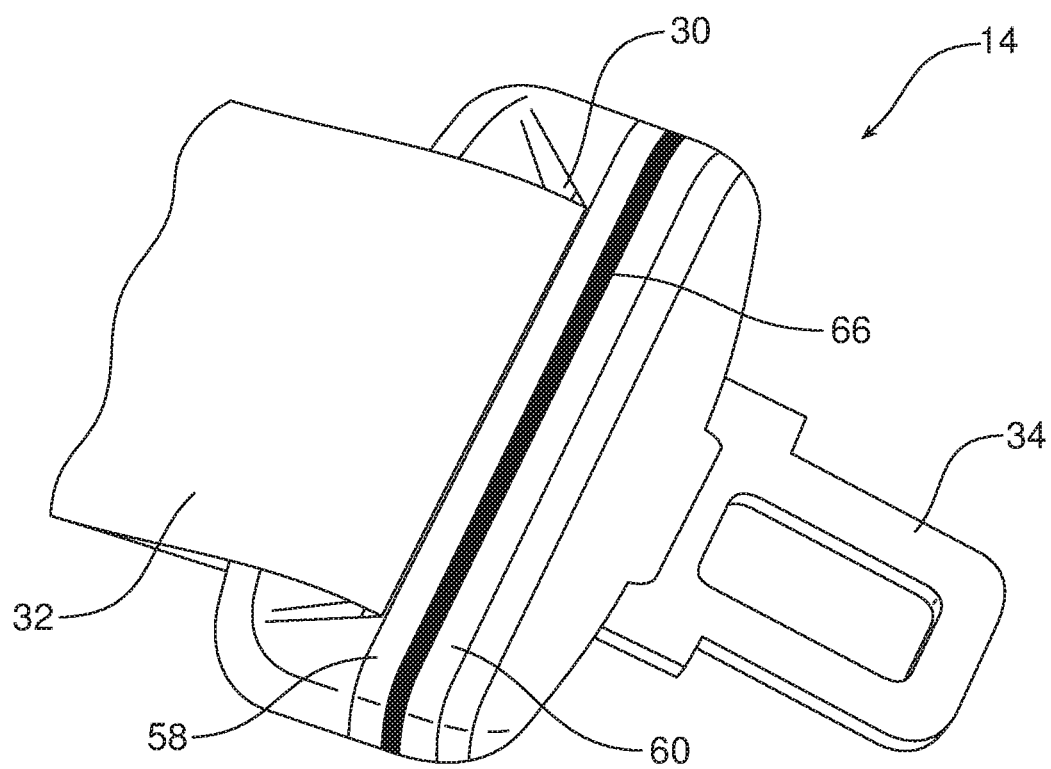
FIG. 5 is a view similar to FIG. 4 but illustrating one possible embodiment of the touch sensor carried on the latch plate assembly.
Figure 6:
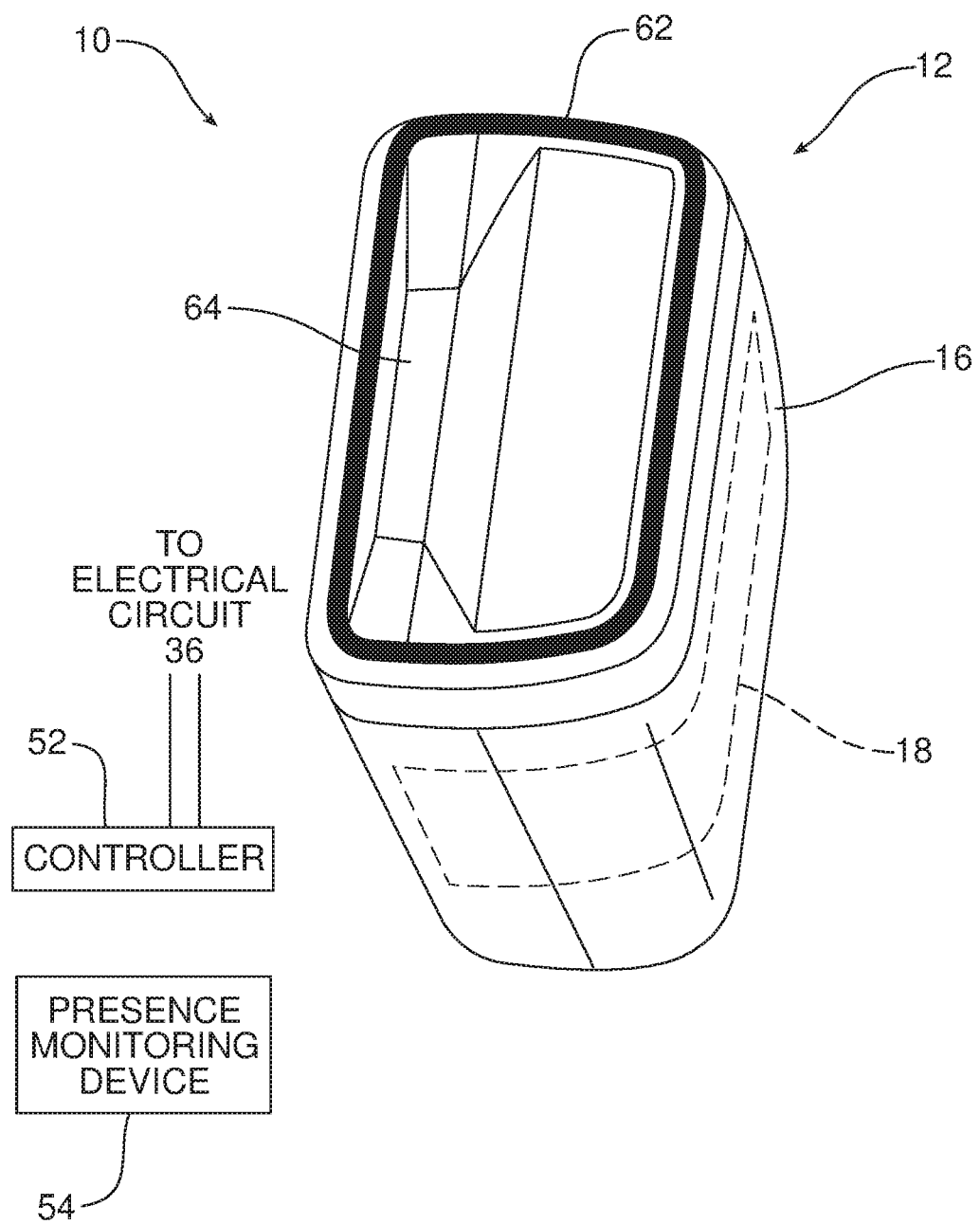
FIG. 6 is a perspective view of the buckle assembly of the second possible embodiment of the seatbelt assembly illustrating the first light source.

A second alternative embodiment of the seatbelt assembly 10 is illustrated in FIGS. 4-6. The second embodiment of the seatbelt assembly 10 includes a buckle assembly 12 and a latch plate assembly 14.

The buckle assembly includes a housing 16 carrying a latching mechanism 18 and a first electrical circuit 20. That first electrical circuit 20 is identical to that described above and illustrated in FIG. 1 and therefore includes a first light source 22, a resistor 24 and a first electrical contact 26 (see also FIG. 7a). The latch plate assembly 14 includes a latch plate 28 having a receiver 30 for slidingly receiving the seatbelt 32 and a tongue 34 for engaging in the latching mechanism 18 (see FIGS. 4 and 5). In addition, the latch plate assembly 14 includes an electrical circuit 36 including a rechargeable battery 38, a second light source 40 and a transistor 43. In addition, the electrical circuit 36 includes a second electrical contact 44 (see also FIG. 7b) adapted to engage the first electrical contact 26 on the buckle assembly 12 when the latch plate assembly is properly connected to the buckle assembly 12. Thus, it should be appreciated that the closing of the first and second electrical contacts 26, 44 allows a pathway for the charging of the rechargeable battery 38 carried on the latch plate assembly 14.

The second embodiment of the seatbelt assembly 10 illustrated in FIGS. 4-6 also includes a controller 52, and a presence monitoring device 54, both of the type described above with respect to the first embodiment of the seatbelt assembly 10. The second embodiment of the seatbelt assembly 10 does not include the normally open reed switch 46 of the first embodiment. Instead, the second embodiment of the seatbelt assembly 10 includes a touch sensor 56 carried on the latch plate assembly 14 (see FIG. 4). More particularly, in the illustrated embodiment, the touch sensor 56 comprises two metal strips 58, 60 carried on the latch plate assembly 14 between the receiver 30 and the tongue 34 (see FIG. 5). The touch sensor 56 is adapted to (a) detect when the motor vehicle occupant touches the latch plate assembly 14 and (b) illuminate the second light source 40 in response to that touch. More particularly, the fingers of the user close the circuit between the two metal strips 58, 60 thereby completing the connection between the rechargeable battery 38 and the second light source 40.

The first embodiment of the seatbelt assembly 10 illustrated in FIGS. 1, 2a-2c, 3a-3b and 7a-7b operates in the following manner. When the motor vehicle occupant sits in the seat associated with the seatbelt assembly 10, the presence monitoring device 54 detects the occupant's presence in the seat and sends an appropriate signal indicative of that fact to the controller 52. In response to receipt of that signal, the controller 52 energizes the first light source 22. In the illustrated embodiment, that first light source 22 comprises a light emitting diode that illuminates a light guide 62 that outlines the tongue receiver 64 of the latching mechanism 18 thereby allowing the seat occupant to locate the buckle assembly 12 even in low light conditions (see FIGS. 3a and 3b).

As illustrated in FIG. 3a, as the seat occupant moves the latch plate assembly 14 toward the buckle assembly, the normally open reed switch 46 is eventually brought into the magnetic field 50 generated by the magnet 48 carried on the housing 16 of the buckle assembly 12. This causes the normally open reed switch 46 to close thereby completing the first electrical circuit 20 between the rechargeable battery 38 and the second light source 40 carried on the latch plate assembly 14. That second light source 40 may comprise a light emitting diode that illuminates a light guide 66 extending across the latch plate assembly 14 between the receiver 30 and the tongue 34.

Here it should be noted that the first light source 22 of the buckle assembly 12 and the second light source 40 of the cooperating latch plate assembly 14 of the seatbelt assembly are of the same color allowing color coded matching of the latch plate assembly to the proper buckle assembly. Upon inserting and securing the tongue 34 of the latch plate assembly 14 in the latching mechanism 18 of the buckle assembly 12, a signal is sent from the seatbelt monitoring system to the controller 52 indicating that the seatbelt assembly is properly secured. In response, the controller 52 deactivates the first light source 22 carried on the buckle assembly 12.

So long as the latch plate assembly 14 is properly connected to the buckle assembly 12, the first electrical contact 26 on the buckle assembly is engaged with the second electrical contact 44 on the latch plate assembly 14. This closes the circuit allowing for the charging of the rechargeable battery 38 carried on the latch plate assembly 14 by means of the power system associated with the motor vehicle.

The seatbelt assembly 10 of the second embodiment illustrated in FIGS. 4-6, 7a and 7b operates as follows. Upon a motor vehicle occupant sitting in the seat associated with the seatbelt assembly 10, the presence monitoring device 54 detects the occupant's presence and sends a presence signal to the controller 52. In response to the receipt of that presence signal, the controller 52 energizes the first light source 22 in the buckle assembly 12.

When the occupant grasps the latch plate assembly 14, the circuit between the metal strips 58 and 60 of the touch sensor 56 is closed causing the rechargeable battery 38 to power and thereby illuminate the second light source 40. Thus, the first light source 22 illuminates the light guide 62 surrounding the tongue receiver 64 of the latching mechanism 18 while the second light source 40 illuminates the light guide 66 on the latch plate assembly 14 in a matching color light. Thus, the operator utilizes the color coded seatbelt assembly 10 to ensure that the latch plate assembly 14 is connected to the proper buckle assembly 12. Once the tongue 34 of the latch plate assembly 14 is properly engaged in the latching mechanism 18 of the buckle assembly 12, the seatbelt monitoring system sends a connected status signal to the controller 52. In response, the controller 52 de-energizes the first light source 22 of the buckle assembly 12. The second light source 40 on the latch plate assembly 14 was previously de-energized when the occupant released his grip on the latch plate assembly 14.

So long as the latch plate assembly 14 is properly secured to the buckle assembly 12, the first electrical contact 26 on the buckle assembly is engaged with the second electrical contact 44 on the latch plate assembly. This completes an electrical circuit allowing for the power system of the motor vehicle to charge the rechargeable battery 38 of the latch plate assembly 14.

A third embodiment of the seat belt assembly 10 is illustrated in FIG. 8. The third embodiment of the seat belt assembly 10 includes a buckle assembly 100, a seat belt retractor 102, a latch plate assembly 104 and a seat belt 106 connecting the seat belt retractor to the latch plate assembly. More specifically, the buckle assembly 100 includes a housing 108 carrying a latching mechanism 110 and a first light source 112. The latch plate assembly 104 includes a latch plate 114 and a second light source 116. The seat belt 106 includes an electrical conductor 118. Electrical power from the motor vehicle power source 120 may be selectively routed by the controller 122 through the seat belt retractor 102 and down the electrical conductor 118 integrated into the seat belt 106.

When the seat occupant pulls on the latch plate assembly 104, one or more electrical contacts 124 carried on the latch plate assembly engage and make electrical contact with the electrical conductor 118 thereby routing electrical power to the second light source 116 on the latch plate assembly. This causes the second light source 116 to be illuminated.

If desired, the electrical conductor 118 may be made from an electrotextile material, a conductive ink, a combination of the two or a like material that will illuminate in response to connection with the power source 120. In such an embodiment, both the electrical conductor 118 extending along the seat belt 106 and the second light source 116 on the latch plate assembly 104 are illuminated in a color that may be matched to the first light source 112 on the mating buckle assembly 100.

The controller 122 of such an embodiment may be configured to (a) illuminate the first light source 112 in response to a motor vehicle occupant occupying a seat associated with the seat belt assembly and (b) illuminate the second light source 116 in response to the motor vehicle occupant paying out the seat belt 106 from the seat belt retractor 102.

The fourth embodiment of the seat belt assembly 10 illustrated in FIG. 9 includes: (a) a buckle assembly 200, (b) a seat belt retractor 202, (c) a latch plate assembly 204, (d) a seat belt 206 connecting the seatbelt retractor with the latch plate assembly and (e) a controller 208.

More specifically, the buckle assembly 200 includes a housing 210 carrying a latching mechanism 212 and a first light source 214. The seat belt 206 includes a second light source 216. In the embodiment illustrated in FIG. 9, that second light source 216 comprises an electrotextile material, a conductive ink, a combination of those two or a like structure that may be integrated into the seat belt and illuminated in a desired color by the application of an electric current from the power source 218.

The controller 208 may be configured to (a) illuminate the first light source 214 in response to a motor vehicle occupant occupying a seat associated with the seat belt assembly and (b) illuminate the second light source 216 in response to the motor vehicle occupant paying out the seat belt 206 from the seat belt retractor 202. When the latch plate 220 of the latch plate assembly 204 is fully engaged by the latching mechanism 212 in the buckle assembly 200, the controller 208 may be configured to cut off electrical power from the power source 218 to both the first light source 214 and the second light source 216 thereby extinguishing those light sources.

The foregoing has been presented for purposes of illustration and description. It is not intended to be exhaustive or to limit the embodiments to the precise form disclosed. Obvious modifications and variations are possible in light of the above teachings. For example, in the illustrated embodiments, the first and second light sources 22, 40 are light emitting diodes. It should be appreciated that other light sources may be utilized if desired. All such modifications and variations are within the scope of the appended claims when interpreted in accordance with the breadth to which they are fairly, legally and equitably entitled.

What is claimed:

1. A seat belt assembly, comprising:
a buckle assembly including a housing carrying a latching mechanism, a first light source and a first electrical contact;
a seat belt; and
a latch plate assembly carried on said seat belt, said latch plate assembly including a latch plate and an electrical circuit including a battery, a second light source and a second electrical contact.

2. The seat belt assembly of claim 1 wherein said first light source and said second light source are identical in color.

3. The seat belt assembly of claim 2, wherein said first electrical contact engages said second electrical contact when said latch plate is locked in said latching mechanism in order to allow charging of said battery.

4. The seat belt assembly of claim 3, wherein said latch plate assembly includes a switch between said battery and said second light source.

5. The seat belt assembly of claim 4, wherein said switch is a normally open reed switch.

6. The seat belt assembly of claim 5, wherein said buckle assembly includes a magnet carried on said housing wherein a magnetic field of said magnet closes said normally open reed switch when said latch plate assembly is moved near said buckle assembly thereby illuminating said second light source.

7. The seat belt assembly of claim 6, further including a controller configured to illuminate said first light source in response to a motor vehicle occupant occupying a seat associated with said seat belt assembly.

8. The seat belt assembly of claim 7, further including a presence monitoring device adapted to send an occupancy signal to said controller when said motor vehicle occupant is occupying said seat.

9. The seat belt assembly of claim 8, wherein said controller is configured to turn off said first light source when said latch plate assembly is properly secured to said buckle assembly.

10. The seat belt assembly of claim 9, wherein said first light source is a first light emitting diode and said second light source is a second light emitting diode.

11. The seat belt assembly of claim 3, further including a controller configured to illuminate said first light source in response to a motor vehicle occupant occupying a seat associated with said seat belt assembly.

12. The seat belt assembly of claim 11, further including a presence monitoring device adapted to send an occupancy signal to said controller when said motor vehicle occupant is occupying said seat.

13. The seat belt assembly of claim 12, wherein said latch plate assembly further includes a touch sensor adapted to (a) detect when said motor vehicle occupant touches said latch plate assembly and (b) illuminate said second light source in response to a touch.

14. The seat belt assembly of claim 13, wherein said controller is configured to turn off said first light source and said second light source when said latch plate assembly is properly secured to said buckle assembly.

15. The seat belt assembly of claim 14, wherein said first light source is a first light emitting diode and said second light source is a second light emitting diode.

16. A seat belt assembly, comprising;
a buckle assembly including a housing carrying a latching mechanism and a first light source;
a seat belt retractor;
a latch plate assembly including a latch plate and a second light source; and
a seat belt connecting said seat belt retractor and said latch plate assembly, said seat belt including an electrical conductor delivering electrical power from said seat belt retractor to said second light source.

17. The seat belt assembly of claim 16, further including a controller configured to (a) illuminate said first light source in response to a motor vehicle occupant occupying a seat associated with said seat belt assembly and (b) illuminate said second light source in response to said motor vehicle occupant paying out said seat belt from said seat belt retractor.

18. The seat belt assembly of claim 17, wherein said electrical conductor is illuminated with said second light source.

19. A seat belt assembly, comprising:
a buckle assembly including a housing carrying a latching mechanism and a first light source;
a seat belt retractor;
a latch plate assembly;
a seat belt connecting said seat belt retractor to said latch plate assembly, said seat belt including a second light source; and
a controller configured to (a) illuminate said first light source in response to a motor vehicle occupant occupying a seat associated with said seat belt assembly and (b) illuminate said second light source in response to said motor vehicle occupant paying out said seat belt from said seat belt retractor.

20. The seat belt assembly of claim 19, wherein said second light source is selected from a group consisting of an electrotextile material, a conductive ink or combinations thereof.

* * * * *